United States Patent
Uematsu et al.

(10) Patent No.: US 7,394,227 B2
(45) Date of Patent: Jul. 1, 2008

(54) POWER GENERATION CONTROL APPARATUS FOR VEHICLE

(75) Inventors: Tadashi Uematsu, Gamagoori (JP); Tadatoshi Asada, Anjo (JP); Fuyuki Maehara, Nagoya (JP)

(73) Assignee: Denso Corporation, Kariya (JP)

( * ) Notice: Subject to any disclaimer, the term of this patent is extended or adjusted under 35 U.S.C. 154(b) by 43 days.

(21) Appl. No.: 11/528,656

(22) Filed: Sep. 28, 2006

(65) Prior Publication Data

US 2007/0085511 A1     Apr. 19, 2007

(30) Foreign Application Priority Data

Oct. 17, 2005   (JP)   ............... 2005-301559

(51) Int. Cl.
    *H02P 9/10*   (2006.01)
(52) U.S. Cl. ............... 322/37; 322/27; 322/28
(58) Field of Classification Search ............ 322/22, 322/23, 25, 27, 28, 29, 36, 37, 99
    See application file for complete search history.

(56) References Cited

U.S. PATENT DOCUMENTS

| 6,426,609 | B2 | 7/2002 | Tanaka et al. |
| 6,900,618 | B2 * | 5/2005 | Maehara ............... 322/28 |
| 7,294,991 | B2 * | 11/2007 | Kimura et al. ............... 322/37 |
| 2003/0178973 | A1 * | 9/2003 | Maehara ............... 322/27 |

FOREIGN PATENT DOCUMENTS

| DE | 102 00 733 A1 | 7/2003 |
| DE | 103 09 326 A1 | 10/2003 |
| JP | A 5-44518 | 2/1993 |
| JP | A 2001-245441 | 9/2001 |
| JP | A 2003-284257 | 10/2003 |
| JP | A 2004-137973 | 5/2004 |

* cited by examiner

*Primary Examiner*—Nicholas Ponomarenko
(74) *Attorney, Agent, or Firm*—Oliff & Berridge, PLC

(57) ABSTRACT

A vehicle power generation control apparatus has a power supply circuit, a rotation detecting circuit, an exciting current detecting circuit, a torque detecting/maximum exciting current determining circuit, and an exciting current control circuit. The rotation detecting circuit detects a rotation speed of a generator (or vehicle alternator) and the exciting current detecting circuit detects an exciting current flowing through an exciting winding of the generator. The torque detecting/maximum exciting current determining circuit calculates a power generation torque of the generator based on the output voltage, the exciting current, the rotation speed, and calculates an inertia torque of the generator based on a change rate of the rotation speed. The exciting current control circuit suppresses the exciting current flowing through the exciting winding so that a change rate of a total sum of the generation torque and the inertia torque does not exceed a predetermined value, for example, during the idling condition.

6 Claims, 5 Drawing Sheets

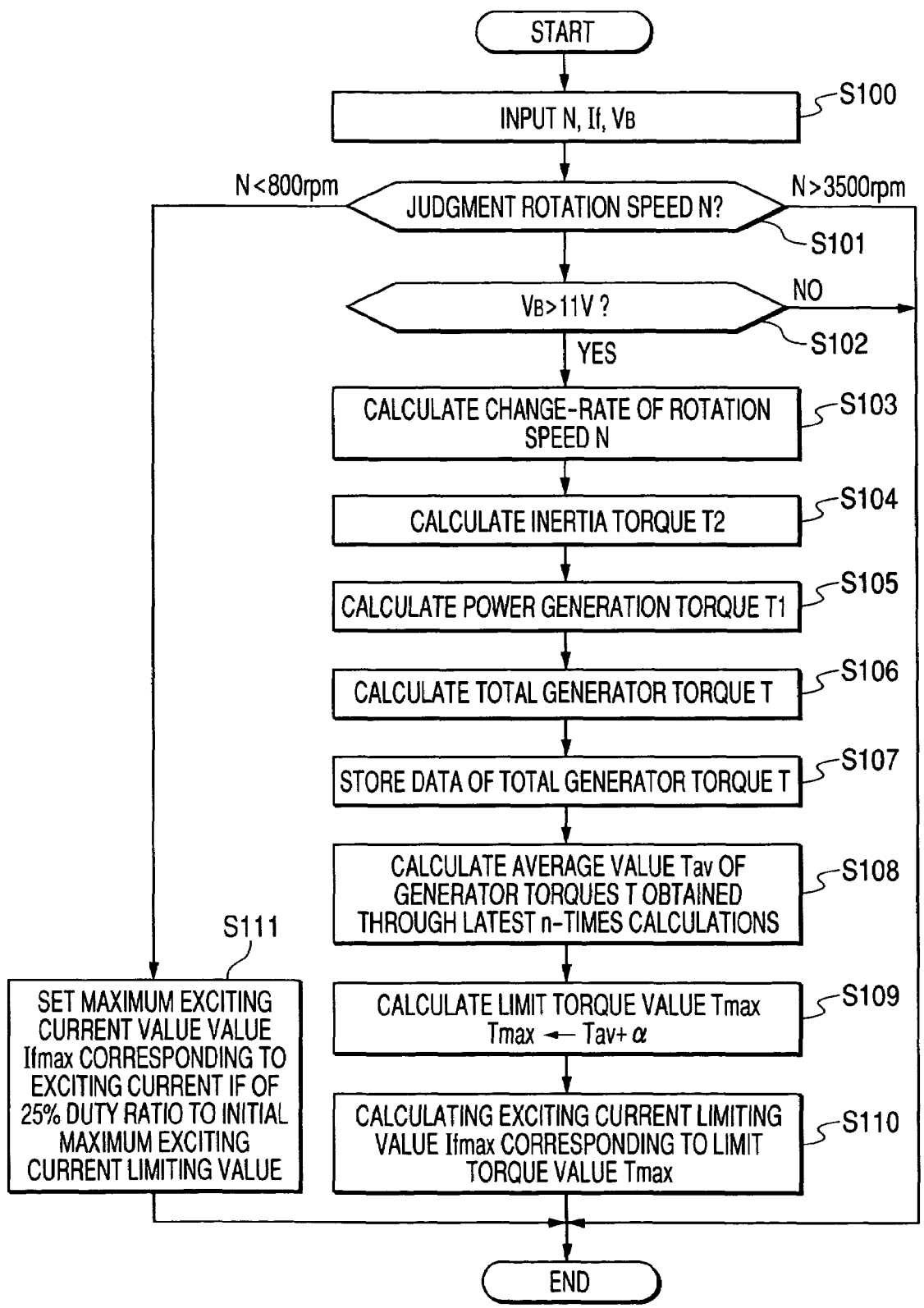

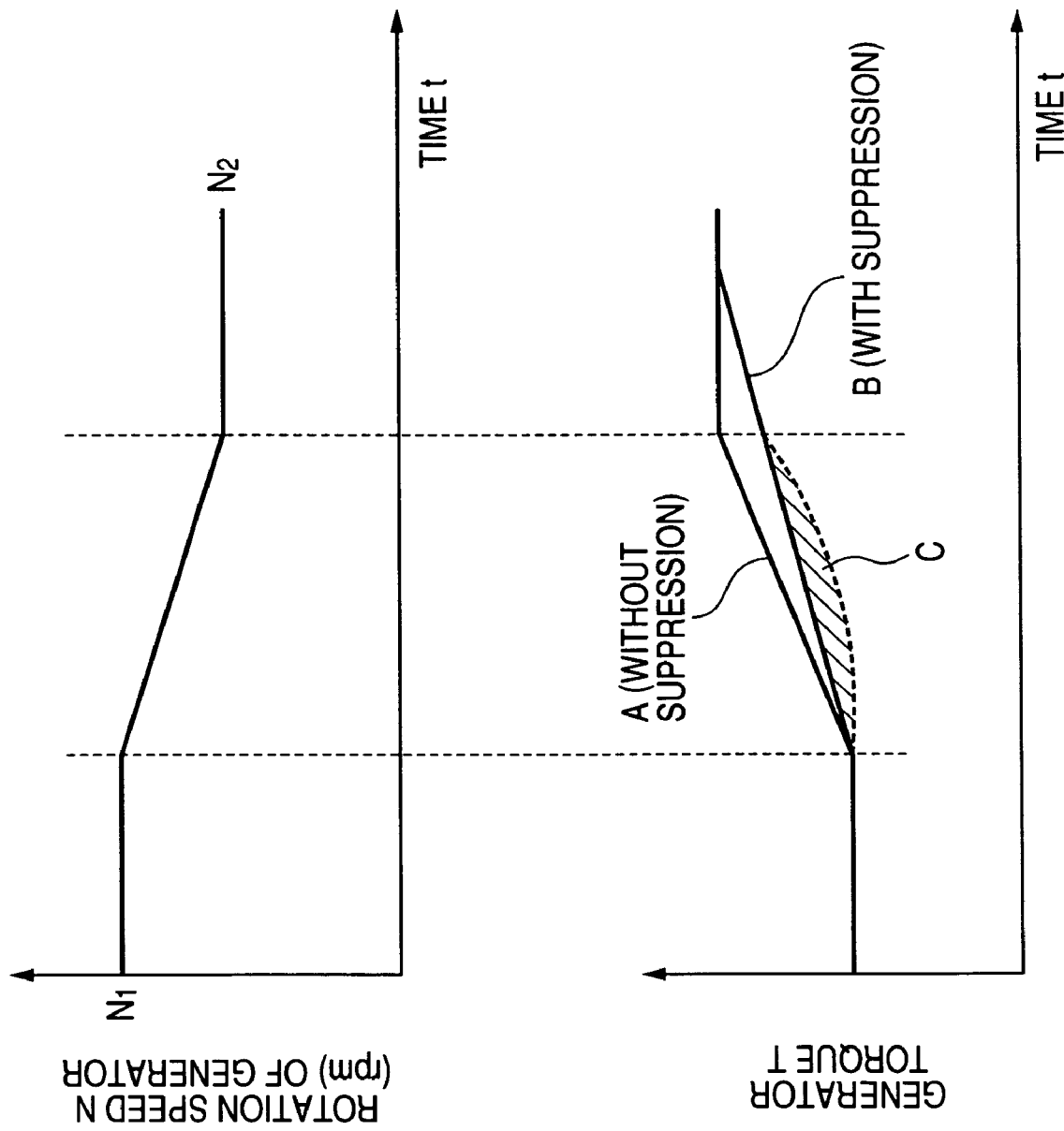

# POWER GENERATION CONTROL APPARATUS FOR VEHICLE

CROSS-REFERENCE TO RELATED APPLICATIONS

This application is related to and claims priority from Japanese Patent Application No. 2005-301559 filed on Oct. 17, 2005, the contents of which are hereby incorporated by reference.

BACKGROUND OF THE INVENTION

1. Field of the Invention

The present invention relates to a power generation control apparatus, for use in a motor vehicle (or vehicle), capable of controlling an output voltage of a vehicle generator (or vehicle alternator) to be mounted on the vehicle such as a passenger car and a truck.

2. Description of the Related Art

In the recent years, a motor vehicle (or vehicle) tends to decrease a rotation speed (or rotation number) of a vehicle engine (or engine) mounted thereon during the idling condition as low as possible in order to reduce its fuel consumption. However, when a rotation speed of the engine becomes low, the output torque of the engine becomes low indeed. Thereby, the variation of the driving torque for auxiliary devices such as a vehicle generator (or vehicle alternator), connected to the engine through a belt, greatly affects the stability of the rotation speed of the engine during its idling condition. In such a background, there is a conventional technique to provide a stable rotation speed of the engine, in which a generation torque of the vehicle generator is calculated based on an exciting current and a rotation speed of the vehicle generator, and the technique controls so that a change rate of the calculated generation torque of the vehicle generator does not exceed a predetermined value. For example, Japanese patent laid open publication number JP 2003-284257 discloses such a technique (see pages 3 to 6 and FIGS. 1 to 6).

However, although the conventional power generation control apparatus disclosed in JP 2003-284257 is capable of estimating the torque of the vehicle generator during a stable rotation speed of the vehicle generator, it is difficult to estimate an accurate torque of the vehicle generator during a varying rotation speed of the engine, and as a result, the conventional technique introduces the voltage drop of the output voltage of the vehicle generator more than necessary and it is thereby difficult to perform the optimum control of the exciting current flowing through the exciting winding. The reason why is as follows. During the varying rotation speed of the engine, an estimated output torque of the vehicle generator is different from an actual torque of the vehicle generator because an inertia torque caused by the moment of inertia of the vehicle generator itself is generated in direction to nullify the variation of the rotation speed of the engine.

The above conventional power generation control apparatus disclosed in JP 2003-284257 suppresses the exciting current in order to reduce the change rate of the torque of the vehicle generator and the output voltage of the vehicle generator is thereby dropped, and such a technique further decrease the output voltage because the estimated torque of the vehicle generator calculated becomes a large value, and the large value of the estimated torque further suppresses the amount of the exciting current because of not considering any inertia torque of the vehicle generator. Thus, the conventional technique involves such a drawback.

SUMMARY OF THE INVENTION

It is an object of the present invention to provide an improved power generation control apparatus for a vehicle capable of minimizing a voltage drop of the output voltage of the vehicle generator (or vehicle alternator) caused by the suppression of the torque by increasing the estimation accuracy of the torque of the vehicle generator.

For this purpose, in accordance with the present invention, there is provided a power generation control apparatus for use in a vehicle that controls an output voltage of a vehicle generator mounted on a vehicle by interrupting a current supply to an exciting winding of the vehicle generator. The power generation control apparatus has an output voltage detecting means, an exciting current detecting means, a rotation speed detecting means, a torque estimating and exciting current limiting value determining means, and an exciting current control means. The output voltage detecting means is configured to detect an output voltage of the vehicle generator. The exciting current detecting means is configured to detect an exciting current flowing through the exciting winding. The rotation speed detecting means is configured to detect a rotation speed of the vehicle generator. The torque estimating and exciting current limiting value determining means is configured to estimate a generation torque of the vehicle generator based on the output voltage, the exciting current, and the rotation speed detected by the output voltage detecting means, the exciting current detecting means, and the rotation speed detecting means, respectively. The torque estimating and exciting current limiting value determining means is configured to further estimate an inertia torque of the vehicle generator based on a change rate of the rotation speed detected by the rotation speed detecting means. The exciting current control means is configured to control suppression of the exciting current flowing through the exciting winding so that a change rate of a sum of the generation torque and the inertia torque detected by the torque estimating and exciting current limiting value determining means does not exceed a predetermined value.

Thereby, the power generation control apparatus of the present invention is capable of minimizing the suppression of the exciting current flowing through the exciting winding and of decreasing the voltage drop of the output voltage of the vehicle generator even if the power generation control apparatus is in a transient state or unstable state in which the rotation speed of the engine is varied and fluctuated.

Further, it is preferred that the exciting current control means performs the suppression of the exciting current during the idling condition of the vehicle engine. It is thereby possible to improve and maintain the stable rotation speed of the engine during the idling condition in which the rotation speed of the engine is lower and unstable. It is further possible to prevent the voltage drop of the output voltage of the vehicle generator by halting the suppression of the exciting current during a higher rotation speed of the engine in which the torque of the engine is relatively higher.

Still further, it is preferred that the exciting current control means halts the suppression of the exciting current while the output voltage of the vehicle generator is lower than a predetermined voltage. If the suppression control of the exciting current is performed when one or more large electrical loads are connected to the vehicle generator to cause a larger voltage drop of not less than a predetermined value of the output voltage of the vehicle generator, namely, to cause that the output voltage of the vehicle generator becomes not more than a predetermined voltage value, there is a possibility to further drop the output voltage of the vehicle generator, and thereby this causes malfunction of the electrical loads of various kinds. Accordingly, it is possible to prevent any occurrence of the malfunction of the electrical loads, which is caused by the voltage drop of the output voltage of the vehicle generator, by halting the suppression operation of the exciting current while the output voltage is lower than the predetermined voltage.

BRIEF DESCRIPTION OF THE DRAWINGS

A preferred, non-limiting embodiment of the present invention will be described by way of example with reference to the accompanying drawings, in which:

FIG. 6 is a flow chart showing an operational procedure performed by a microcomputer incorporated in the torque detecting/maximum exciting current determining circuit shown in FIG. 5;

FIG. 7A is a diagram showing the decrease of a rotation speed N of the vehicle generator; and FIG. 7B is a diagram showing a variation of a generation torque T1 of the vehicle generator when the rotation speed N of the vehicle generator is decreased.

DETAILED DESCRIPTION OF THE PREFERRED EMBODIMENTS

Figure 1:
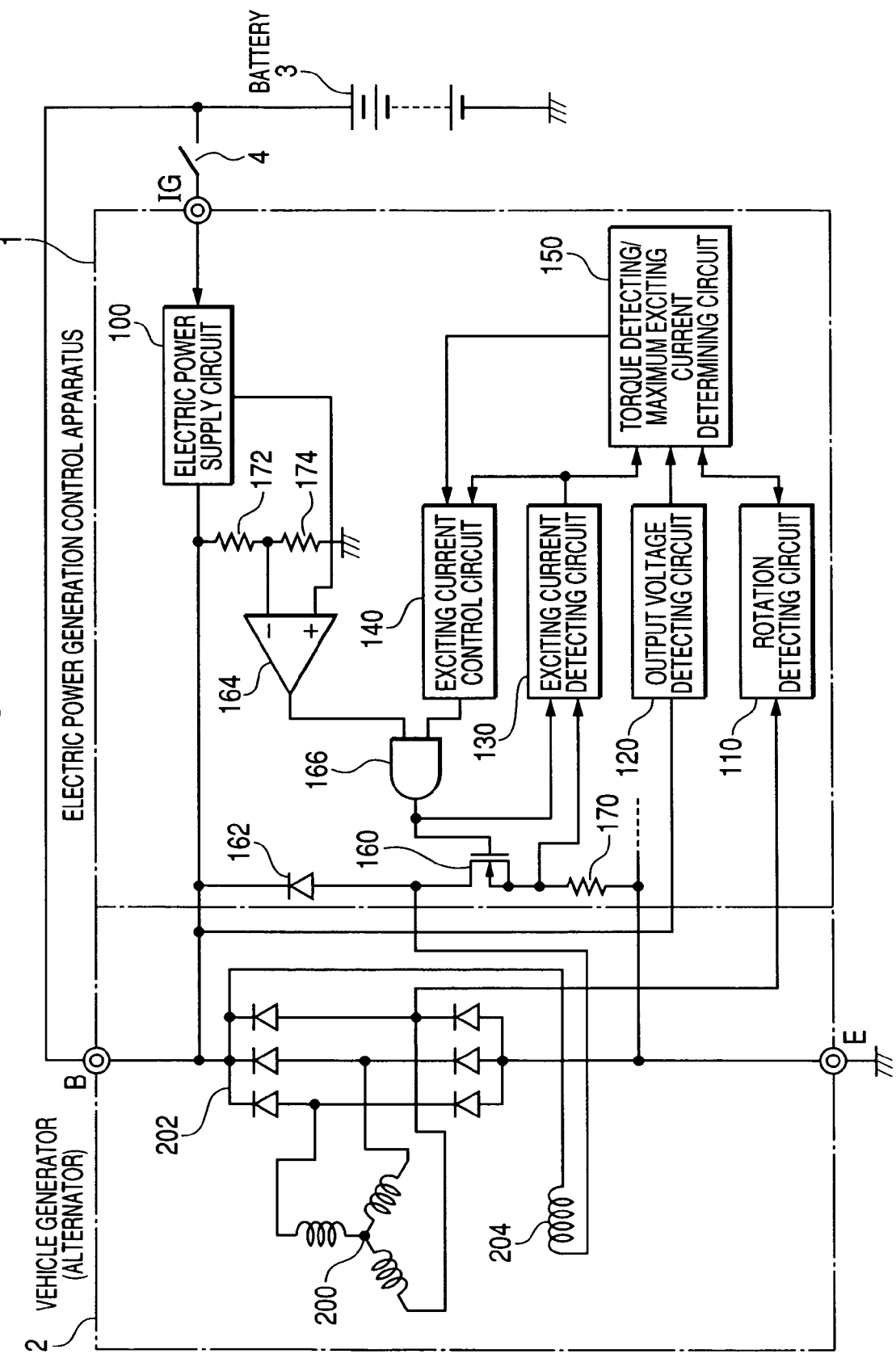
FIG. 1 is a diagram showing a configuration of a power generation control apparatus for a vehicle according to an embodiment of the present invention.

Hereinafter, various embodiments of the present invention will be described with reference to the accompanying drawings. In the following description of the various embodiments, like reference characters or numerals designate like or equivalent component parts throughout the several views.

EMBODIMENT

A description will be given of the power generation control apparatus for a vehicle according to a preferred embodiment of the present invention with reference to FIG. 1 to FIG. 7.

FIG. 1 is a diagram showing a configuration of the power generation control apparatus for a motor vehicle (or vehicle) according to the embodiment of the present invention. FIG. 1 shows a preferred configuration of the power generation control apparatus 1 for a vehicle, and further shows the connection state between the power generation control apparatus 1, a vehicle generator 2 (or vehicle alternator), and a battery 3.

In FIG. 1, the power generation control apparatus 1 controls so that a voltage potential at an output terminal B of the vehicle generator 2 has an predetermined regulated set voltage value (for example, 14V). The power generation control apparatus 1 has a power source terminal IG and a ground terminal E in addition to the terminal B. The terminal B is connected to the battery 3. The terminal IG is connected to the battery 3 through a key switch 4, and the terminal E is connected to a frame which accommodates the vehicle generator 2.

The vehicle generator 2 is composed of a three-phase stator winding 200 wound on a stator, a rectification circuit 202 for full-wave-rectifying the three-phase output of the stator winding 200, and an exciting winding 204 wound on a rotor. The control of the output voltage of the vehicle generator 2 is based upon the proper interruption control of the current supply to the exciting winding 204 by an exciting current control circuit 140 (which will be explained in detail later) in the vehicle power generation control apparatus 1. The terminal B of the vehicle generator 2 is connected to the battery 3 to feed a charging current through the terminal B to the battery 3.

A description will now be given of a detailed arrangement and operation of the vehicle power generation control apparatus 1 of the embodiment.

As shown in FIG. 1, the vehicle power generation control apparatus 1 is composed of a power supply circuit 100, a rotation detecting circuit 110, an output voltage detecting circuit 120, an exciting current detecting circuit 130, the exciting current control circuit 140, a torque detecting/maximum exciting current determining circuit 150, a power transistor 160, a reflux diode 162, a voltage comparator 164, an AND circuit 166, and resistors 170, 172 and 174.

The power supply circuit 100 generates a predetermined operating voltage in response to a battery voltage of the battery 3 being applied to the terminal IG through the key switch 4. The rotation detecting circuit 110 monitors a phase voltage developing at any one of the phases of the stator winding 200 in order to detect a phase period of the phase that is necessary to calculate a rotation speed (or rotation number) and a change rate of the rotation of the vehicle generator 2.

The output voltage detecting circuit 120 detects the output voltage of the vehicle generator 2, namely, the voltage at the terminal B. This output voltage detecting circuit 120 is composed of an analogue/digital conversion circuit (A/D converter), for example. The output voltage detecting circuit 120 generates digital data with a predetermined number of bits corresponding to the output voltage of the vehicle generator 2, and then outputs the generated digital data to the torque detecting/maximum exciting current determining circuit 150.

The exciting current detecting circuit 130 detects the exciting current flowing through the exciting winding 204 based on a voltage potential of the source terminal of the power transistor 160 composed of a N-channel MOS field effect transistor. The resistor 170 is connected to the source terminal of the power transistor 160. This resistor 170 acts as a sensing resistor to detect or sense the exciting current flowing through the exciting winding 204. The exciting current detecting circuit 130 detects the exciting current based on the terminal voltage of the resistor 170 when the exciting current flows through the source and drain of the power transistor 160 and the resistor 170.

The exciting current control circuit 140 generates an exciting current control signal so that the exciting current is not more than a predetermined maximum exciting current value. The torque detecting/maximum exciting current determining circuit 150 estimates a power generation torque of the vehicle generator 2 (which will be referred to hereinafter as "a generator torque" (or "a drive torque") of the vehicle generator 2) based on the rotation speed (or rotation number) of the vehicle generator 2 detected by the rotation detecting circuit 110 and the exciting current detected by the exciting current detecting circuit 130. Further, the torque detecting/maximum exciting current determining circuit 150 determines a maximum exciting current value as the upper limit value of the exciting current at this time in order to limit the increase of the vehicle generator torque.

The power transistor 160 is connected to the exciting winding in series. While the power transistor 160 is ON (or activated), the exciting current flows through the exciting winding 204. The reflux diode 162 is connected to the exciting winding 204 in parallel, while the power transistor 160 is OFF, the reflux of the exciting current occurs.

The voltage comparator 164 has a positive input terminal (or a plus terminal) designated by reference character "+" and a negative input terminal (or a minus terminal) designated by reference character "−". A voltage divided by a voltage division circuit is supplied to the negative terminal thereof, and a reference voltage generated by the power supply circuit 100 is supplied to the positive terminal of the voltage comparator 164. The voltage comparator 164 inputs both the voltages through the positive terminal and the negative terminal and compares them. When the voltage divided by a voltage division circuit becomes lower than the reference voltage, namely, when the output voltage of the vehicle generator 2 is lower than the regulated set voltage value, the voltage comparator 164 outputs a high level signal.

The AND circuit 166 inputs the exciting current control signal output from the exciting current control circuit 140 and the output signal from the voltage comparator 164, then performs a logical product (AND) operation of them, and outputs a drive signal as the result of AND operation.

The output terminal of the AND circuit 166 is connected to the gate of the power transistor 160. When receiving the drive signal of a high level output from the AND circuit 166, the power transistor 160 becomes ON.

Figure 2:
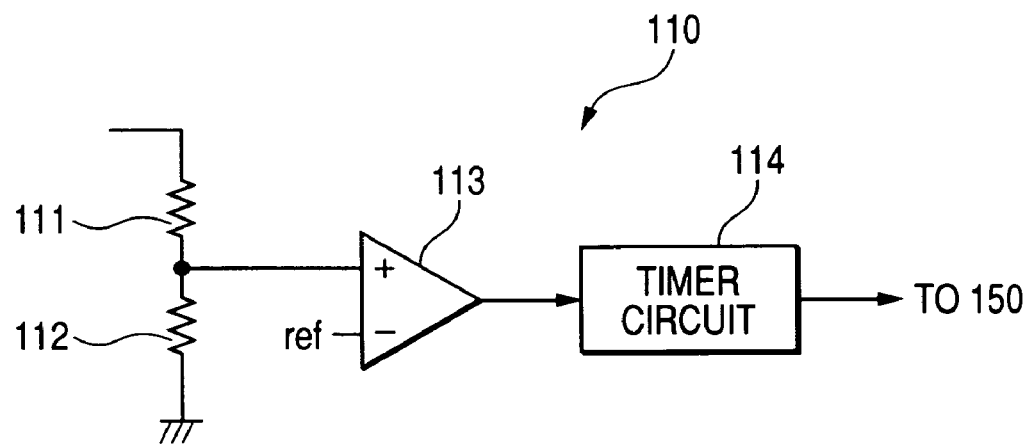
FIG. 2 is a diagram showing a detailed configuration of a rotation detecting circuit incorporated in the power generation control apparatus of the embodiment shown in FIG. 1.

FIG. 2 is a diagram showing a detailed configuration of the rotation detecting circuit 110 incorporated in the power generation control apparatus of the embodiment shown in FIG. 1.

As shown in FIG. 2, the rotation detecting circuit 110 has resistors 111 and 112, a voltage comparator 113, and a timer circuit 114. One phase voltage in the three-phase stator winding 200 is divided by the voltage division circuit composed of the resisters 111 and 112 and the divided voltage is supplied to the positive (+) terminal of the voltage comparator 113. On the contrary, a predetermined reference voltage Vref is supplied to the negative (−) terminal of the voltage comparator 113.

The voltage comparator 113 compares both the divided voltage and the reference voltage Vref in order to perform a wave shaping operation. The voltage comparator 113 outputs a signal after the wave shaping operation to the timer circuit 114. When receiving the signal transferred from the voltage comparator 113, the timer circuit 114 outputs periodic data with a predetermined number of bits (for example, eight bits) corresponding to a period of a rising edge of the signal from the voltage comparator 113. In a concrete example, the timer circuit 114 outputs the periodic data items $\tau 1$, $\tau 2$, $\tau 3$, . . . , $\tau i$, . . . , which correspond to the period from a previous rising timing to a following rising timing.

The inverse value of the periodic data items $\tau i$ correspond to data items $N i$ ($= k \times (1/\tau i)$) of the rotation speed (or rotation number), where k is a constant value and i is a natural number such as 1, 2, 3, . . . . If eight bit data "240" corresponds to a rotation speed (or rotation number) of 800 rpm, eight bit data "200" corresponds to a rotation speed (or rotation number) of 960 rpm, and eight bit data "160" corresponds to a rotation speed of 1,200 rpm. The rotation change rate can be calculated by the equation $(N i - N i - 1)/\tau i$.

Figure 3:
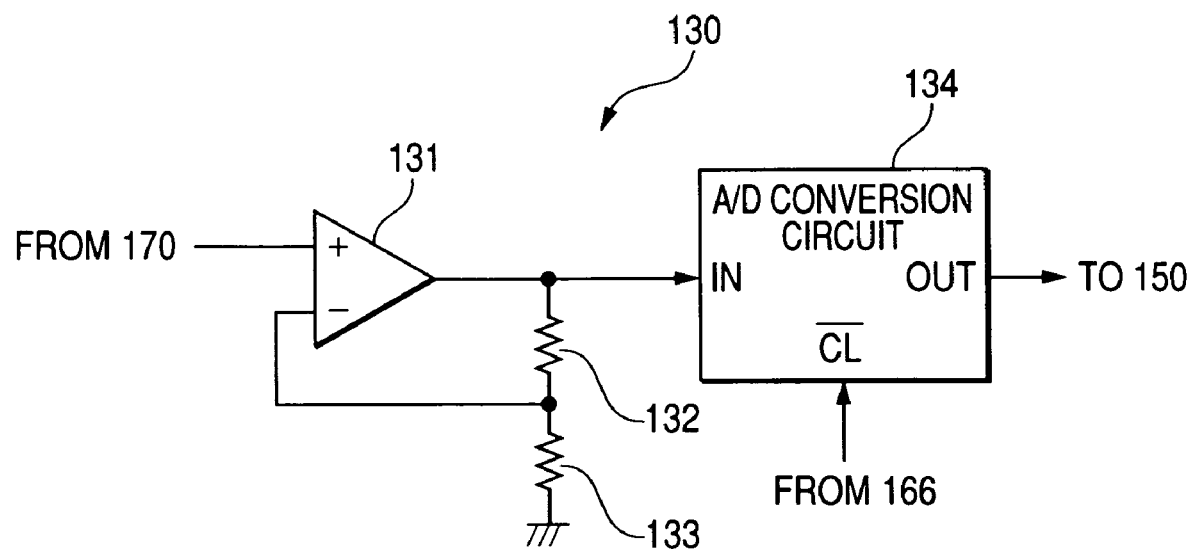
FIG. 3 is a diagram showing a detailed configuration of an exciting current detecting circuit incorporated in the power generation control apparatus of the embodiment shown in FIG. 1.

FIG. 3 is a diagram showing a detailed configuration of then exciting current detecting circuit 130 incorporated in the power generation control apparatus of the embodiment shown in FIG. 1.

As shown in FIG. 3, the exciting current detecting circuit 130 has an operational amplifier 131, resistors 132 and 133, and an A/D conversion circuit 134. The operational amplifier 131 and the two resistors 132 and 133 constitute an amplifier of a predetermined amplification factor which is determined by the resistances of the two resistors 132 and 133. The exciting current detecting circuit 130 amplifies the input voltage having a value corresponding to the exciting current, and outputs the amplified voltage.

The A/D conversion circuit 134 receives, through its input terminal (IN), an output signal as the amplified voltage from the operational amplifier 131, and further receives, through its clock terminal (CL), the drive signal output from the AND circuit 166 in a negative logic fashion. The A/D conversion circuit 134 takes in the output voltage of the operational amplifier 131 at the timing when the drive signal is switched from a high level to a low level, and converts the input voltage to digital data (as an exciting current value) with a predetermined number of bits (for example, eight bits).

Figure 4:
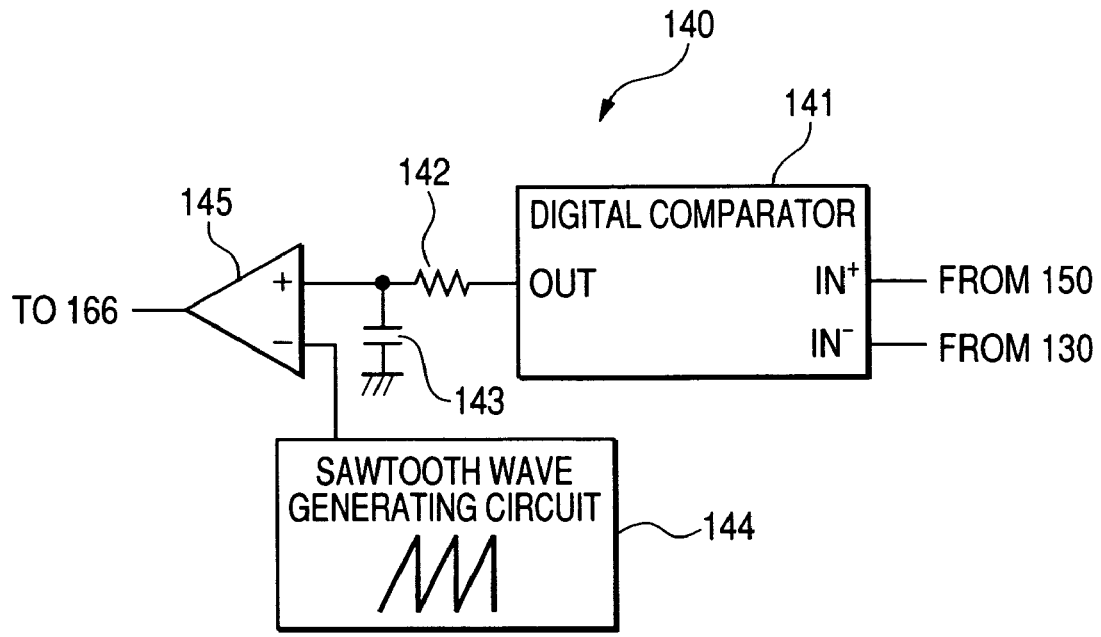
FIG. 4 is a diagram showing a detailed configuration of an exciting current controlling circuit incorporated in the power generation control apparatus of the embodiment shown in FIG. 1.

FIG. 4 is a diagram showing a detailed configuration of the exciting current controlling circuit 140 incorporated in the power generation control apparatus of the first embodiment shown in FIG. 1.

As shown in FIG. 4, the exciting current control circuit 140 is composed of a digital comparator 141, a resistor 142, a capacitor 143, a sawtooth wave generating circuit 144 and a voltage comparator 145. The digital comparator 141 compares a maximum exciting current value input from the torque detecting/maximum exciting current determining circuit 150 to its one input terminal (IN+) with an exciting current value input from the exciting current detecting circuit 130 to its other input terminal (IN−), and outputs a signal of a high level when the maximum exciting current value is larger than the exciting current value.

A smoothing circuit composed of the resistor 142 and the capacitor 143 inputs and smoothes the output signal from the digital comparator 141. The positive (+) terminal of the voltage comparator 145 inputs the smoothed output signal from the smoothing circuit. A negative (−) terminal of the voltage comparator 145 inputs a sawtooth wave generated by the sawtooth wave generating circuit 144. The voltage comparator 145 compares those input signals (the sawtooth signal and the smoothed output signal), and generates and outputs a PWM (pulse width modulation) signal with a duty ratio corresponding to the comparison result.

Figure 5:
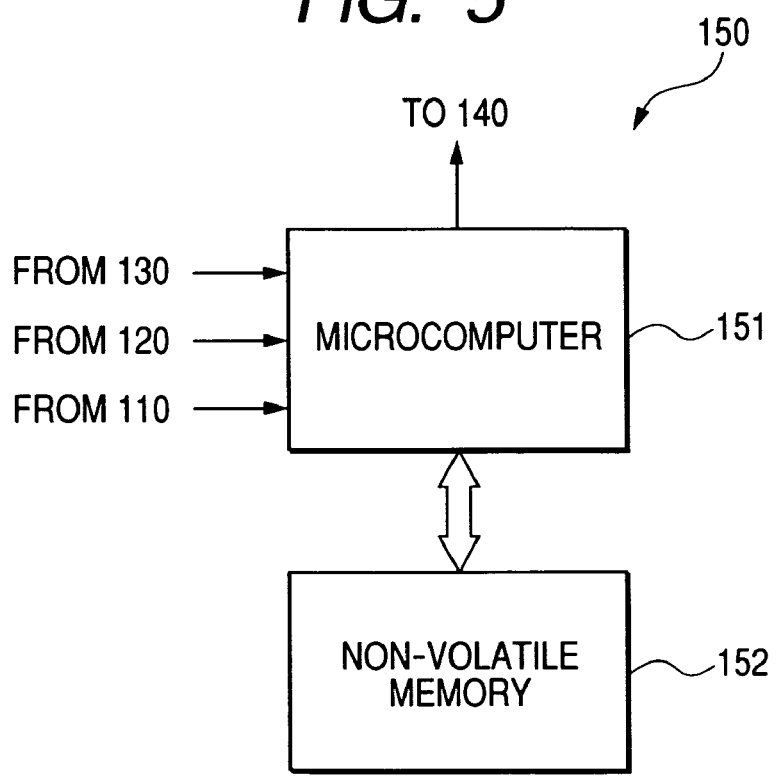
FIG. 5 is a diagram showing a detailed configuration of a torque detecting/maximum exciting current determining circuit incorporated in the power generation control apparatus of the embodiment shown in FIG. 1.

FIG. 5 is a diagram showing a detailed configuration of a torque detecting/maximum exciting current determining circuit 150 incorporated in the power generation control apparatus of the embodiment shown in FIG. 1.

As shown in FIG. 5, the torque detecting/maximum exciting current determining circuit 150 is equipped with a microcomputer 151 and a non-volatile memory 152. The microcomputer 151 inputs the periodic data $\tau$ which is used for calculating a rotation speed (or rotation number) of the vehicle generator 2 detected by the rotation detecting circuit 110, the output voltage value of the vehicle generator 2 detected by the output voltage detecting circuit 120, and the exciting current value detected by the exciting current detecting circuit 130. The microcomputer 151 then executes a predetermined program to calculate the generator torque and the inertia torque of the vehicle generator 2 and determines the maximum exciting current value for imposing a limitation so that an increasing rate of the generator torque obtained by adding both the generator torque an the inertia torque that does not exceed a set value with reference to a calculation table stored in the non-volatile memory 152.

The above-mentioned calculation table includes the relationship among an exciting current If, the rotation speed N of the vehicle generator 2, the output voltage VB, and the generation torque T1, and also includes the relationship between the change rate of the rotation speed N and the inertia torque T2 (where, although the rotation speed N is calculated by the periodic data τ, it is also possible to use the periodic data instead of the rotation speed N as parameters of the calculation table because the rotation speed N and the periodic data τ is in one-to-one correspondence).

The employment of this calculation table enables the calculation of the corresponding generation torque T1 knowing the exciting current If, the rotation speed N (or rotation number), and the output voltage VB, and also permits the calculation of a corresponding exciting current If knowing the rotation speed N (or rotation number), the output voltage VB, and the generation torque T1. Because the calculation equation for the generator torque varies according to the specification of the vehicle generator 2, for example, it is written in the non-volatile memory 152 at the inspections of the vehicle generator 2 or the vehicle power generation control apparatus 1, or the like. Incidentally, in a case in which the calculation table is written to the specification of the vehicle generator 2 in this way, the non-volatile memory 152 is required to allow data to be written at least once.

In addition, because the inertia torque T2 of the vehicle generator 2 is calculated by the equation "(Inertia moment)× (Angular velocity)" and the angular velocity is calculated based on the change rate of the rotation of the vehicle generator 2, it is acceptable to calculate the change rate of the rotation and the inertia torque T2 are calculated each time based on the periodic data τ transferred from the rotation detecting circuit 110.

FIG. 6 is a flow chart showing an operational procedure of the torque detecting/maximum exciting current determining circuit 150 performed under the control of the microcomputer 151 shown in FIG. 5.

When an exciting current If, a rotation speed N (or rotation number), and an output voltage VB are inputted at a predetermined timing (for example, at an interval of 5 msec) (Step S100), the microcomputer 151 makes a judgment on the contents of the rotation speed N (Step S101). When the judgment result indicates that the rotation speed N is within a range of 800 to 3,500 rpm, the microcomputer 151 further makes a judgment as to whether or not the output voltage VB is higher than 11V (Step S102). In more detail, the rotation speed N of the vehicle generator 2 is calculated based on the periodic data τ provided from the rotation detecting circuit 110.

If the output voltage VB is higher than 11V, an affirmative judgment takes place (Step S102). Subsequently, the microcomputer 151 calculates the change rate of the rotation speed N (Step S103), and then calculates an inertial torque T2 of the vehicle generator 2 based on the calculated change rate τ on referring to the calculation table stored in the non-volatile memory 152 (Step S104).

The microcomputer 151 further calculates a generation torque T1 corresponding to the exciting current If, the rotation speed N, and the output voltage VB which have been input in Step S100, on the basis of the calculation table stored in the non-volatile memory 152 (Step S105), and further calculates a total generator torque T that is a sum of the generation torque T1 and the inertia torque T2 (Step S106), and stores them into its own built-in RAM (a random access memory, not shown) (Step S107).

Moreover, the microcomputer 151 calculates an average value Tav of the total generator torques obtained by the latest n-times calculations stored in the built-in RAM (not shown) (Step 108).

The microcomputer 151 then adds an increasing quantity "α" to the average value Tav to obtain a limit torque value Tmax (Step S109), and calculates an exciting current limiting value Ifmax corresponding to this limit torque value Tmax by referring to the calculation table stored in the non-volatile memory 152 (Step S110).

The reference to the calculation table to obtain this exciting current limiting value Ifmax uses a torque value corresponding to the generation torque T1 that is obtained by subtracting the inertia torque T2 from the limit torque value Tmax.

This exciting current limiting value Ifmax is input as a maximum exciting current value from the torque detecting/maximum exciting current determining circuit 150 to the exciting current control circuit 140. Still moreover, when the rotation speed N of the vehicle generator 2 is lower than 800 rpm, that is, when it is considered that the vehicle engine stops, a maximum exciting current value Ifmax corresponding to the exciting current If, whereby the duty ratio becomes 25%, is set as an initial exciting current limiting value (Step S111).

On the other hand, when the rotation speed N of the vehicle generator 2 is higher than 3500 rpm, since it is considered that the engine revolution resides in a stable area, the power generation control apparatus 1 halts, namely, does not perform the above-mentioned generator torque suppression control.

The exciting current detecting circuit 130, the rotation detecting circuit 110, the torque detecting/maximum exciting current determining circuit 150, and the exciting current control circuit 140 described above correspond to the exciting current detecting means, the rotation speed detecting means, the torque estimating and exciting current limiting value determining means (as the torque calculating means and the exciting current control means), respectively, defined in claims.

The vehicle power generation control apparatus 1 according to this embodiment has the configuration described above, and a description will now be given of a control operation thereof.

(1) Before Starting of Engine

When the key switch 4 is entered by a driver of a vehicle to be placed into the on-condition, the power supply circuit 100 generates an operating voltage so that the vehicle power generation control apparatus 1 initiates the exciting current control operation. In a case in which the vehicle generator 2 is in a non-rotating state before the starting of the engine, since the power generation is not made by the vehicle generator 2, the terminal voltage of the battery 3 is approximately 12V which is lower than a predetermined regulated voltage (for example, 14V) so that the output signal of the voltage comparator 164 becomes the high level.

In addition, since the rotation speed N of the vehicle generator 2 is lower than 800 rpm before the starting of the engine, the torque detecting/maximum exciting current determining circuit 150 outputs a maximum exciting current value corresponding to the duty ratio of 25% and the power transistor 160 is placed into an interrupted condition so that the duty ratio of the flowing exciting current is controlled to 25%, thereby setting an initial exciting state.

(2) In Idling Condition

When the key switch 4 is further manipulated up to the engine starting position to rotate a starter for starting the engine of the vehicle and the rotation speed N of the vehicle generator 2 increases up to the idling revolutions of the engine, the electric power generation initiates. If the rotation speed N of the vehicle generator 2 reaches approximately 2,000 rpm, the release from the above-mentioned initial exciting state takes place, and the torque detecting/maximum exciting current determining circuit 150 then initiates the torque suppression control.

The limit torque value Tmax (=Tav+α), namely, the maximum exciting current value, corresponding to the average value Tav of the generator torques obtained through the latest n-times calculations are calculated, where "n" is a natural number. The exciting current If is so supplied that the exciting current does not exceed the maximum exciting current.

Accordingly, the exciting current If increases gradually from the exciting current If corresponding to a duty ratio of 25% until the output voltage VB reaches the regulated voltage, and the generator torque T also increases gradually, and it is thereby possible to stabilize the idling condition immediately following the starting.

In addition, because the output of the voltage comparator 164 is switched into a low level when the output voltage VB further exceeds the regulated voltage, and, hence, a drive signal output from the AND circuit 166 is also switched into a low level, so that the power transistor 160 is placed into the off-condition to reversely lower the output voltage VB.

As set forth in detail, in a state where the electrical load and the rotation speed N of the vehicle generator 2 is stable during the idling condition, the exciting current limiting value Ifmax is set to be slightly larger than the actual exciting current If, and the output voltage VB is controlled to a regulated voltage without exerting influence on the control of the output voltage VB.

(3) In Idling Condition (Activation of Electrical Load)

When an electrical load is activated during the idling condition, the terminal voltage of the terminal B of the battery 3 drops in a moment. At this time, although the output of the voltage comparator 164 is maintained at the high level, the actual exciting current If only increases up to the exciting current limiting value Ifmax. For this reason, the generator torque does not increase immediately and a reduction of the engine revolution stemming from the activation of the electrical load does not occur in most cases. Following this, because the limit torque value Tmax is updated at an interval of set time to increase and, with this situation, the exciting current limiting value Ifmax also increases, and a return to a steady state is made at the time that the output voltage VB reaches the regulated voltage.

FIG. 7A is a diagram showing the decrease of a rotation speed N (or rotation number) of the vehicle generator. FIG. 7B is a diagram showing a variation of a generation torque T1 of the vehicle generator when the rotation speed N of the vehicle generator is decreased from N1 to N2.

Under the conventional case prescribed above in which the conventional power generation control apparatus does not perform the exciting current suppression control, when the output voltage of the vehicle generator becomes lowers in accordance with the reduction of the rotation speed N of the vehicle generator, an exciting current If increases gradually in order to compensate the reduction of the generation power of the vehicle generator, and the generator torque of the vehicle generator is thereby increased. FIG. 7B shows such a compensation operation as designated by reference character "A".

On the contrary, if the conventional exciting current suppression control disclosed in JP 2003-284257 is performed, because in order to suppress the increasing rate of the generation torque designated by reference character "B" shown in FIG. 7B to a predetermined value or below, the conventional power generation control apparatus estimates the generation torque based on the output voltage of the vehicle generator and the exciting current, and then suppresses the exciting current using a calculated exciting current based on the estimated generation torque. However, in the estimation of the generator torque of the vehicle generator, the conventional technique does not consider the presence of the inertia torque of the vehicle generator 2 in the area C designated by slanting lines shown in FIG. 7B. Therefore, because the conventional technique estimates a larger generator torque than an actual generator torque, and calculates the amount of the exciting current to be suppressed based on the estimated larger generator torque, the exciting current limiting value becomes a large value, and as a result, the drop of the output voltage of the vehicle generator becomes large because of the occurrence of such a large difference between the actual power generation and the estimated power generation. If a brightness of headlights drops during waiting for traffic signal change in night, a driver of a vehicle firstly notices a drop of the output voltage of the vehicle generator and feels uneasy. When the output voltage of the vehicle generator greatly drops, there is a possibility to occur malfunction of electronic devices of various types mounted on a vehicle in the worst case.

On the other hand, because the power generation control apparatus for a vehicle according to the present invention is capable of estimating an accurate generation torque involved in the generator torque while considering the amount of the inertial torque generated in the variation of the rotation speed (or rotation number) of the vehicle generator, it is possible to avoid unnecessary suppression of the exciting current, and thereby possible to perform the suppression of the drop of the output voltage of the vehicle generator as low as possible.

(4) In Idling Condition (Discharge from Battery)

In a case in which, during an idling condition, a large electrical load is activated when the battery 3 is in a discharging condition so that the terminal voltage B of the battery 3 becomes below 11V, Step S102 in FIG. 6 shows a negative judgment and, hence, the torque detecting/maximum exciting current determining circuit 150 does not perform the exciting current limitation so as not to execute the torque suppression control according to the present invention. This can prevent the output voltage VB of the vehicle generator from further dropping to cause the malfunctions of the various types of electrical loads.

(6) In Running Condition

While the vehicle is running, since the engine revolution increases so that the generator rotation speed N becomes higher than 3,500 rpm, the torque detecting/maximum exciting current determining circuit 150 does not perform the limitation to the exciting current, so that the torque suppression control according to the present invention does not take place. Therefore, in a case in which the rotation speed of the engine (or engine revolution) is stable and the torque suppression control is unnecessary, the exciting current control based on the output voltage of the vehicle generator is implemented preferentially, and it is thereby possible to supply the stable operating voltage to the electrical loads.

As described above, according to the implementation of the torque suppression control in the vehicle power generation control apparatus 1 according to the embodiment of the present invention, because the power generation control apparatus 1 for a vehicle performs the torque suppression control even if the rotation speed N of the vehicle generator 2 is varied in unstable state, it is possible to estimate the generator torque T of the vehicle generator 2 and the generation torque T1 included in the generator torque T with a high precisely, and possible to perform the suppression of the exciting current as low as possible, it is thereby possible to reduce the drop of the output voltage caused by this voltage drop. In addition, by inhibiting the execution of the suppression of the generator torque when the output voltage of the vehicle generator 2 drops extremely, it is possible to prevent the electrical loads from malfunctioning due to the voltage drop of the output voltage of the vehicle generator.

The present invention is not limited by the above embodiment, and it is possible to apply the concept of the present invention without the scope of the present invention. For example, although the torque detecting/maximum exciting current determining circuit 150 incorporated in the power generation control apparatus 1 calculates the limit torque value Tmax and the exciting current limiting value Ifmax, it is possible that an external device such as an engine control unit (ECU) has such a calculation function. That is, it is possible that the power generation control apparatus for a vehicle detects the rotation speed N (or rotation number) of the vehicle generator, the exciting current If, and the output voltage VB of the vehicle generator, then transfers those detected data items to an external device such as the ECU. Then, the ECU receives those data items and calculates the exciting current limiting value Ifmax, and transfers, namely, returns the calculated the exciting current limiting value Ifmax to the power generation control apparatus for a vehicle.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalent thereof.

What is claimed is:

1. A power generation control apparatus for a vehicle, that controls an output voltage of a vehicle generator mounted on a vehicle by interrupting a current supply to an exciting winding of the vehicle generator, comprising:

output voltage detecting means configured to detect an output voltage of the vehicle generator;

exciting current detecting means configured to detect an exciting current flowing through the exciting winding;

rotation speed detecting means configured to detect a rotation speed of the vehicle generator;

torque estimating and exciting current limiting value determining means configured to estimate a generation torque of the vehicle generator based on the output voltage, the exciting current, and the rotation speed detected by the output voltage detecting means, the exciting current detecting means, and the rotation speed detecting means, respectively, and torque estimating and exciting current limiting value determining means configured to further estimate an inertia torque of the vehicle generator based on a change rate of the rotation speed detected by the rotation speed detecting means; and exciting current control means configured to control suppression of the exciting current flowing through the exciting winding so that a change rate of a sum of the generation torque and the inertia torque detected by the torque estimating and exciting current limiting value determining means does not exceed a predetermined value.

2. The power generation control apparatus for a vehicle according to claim 1, wherein the exciting current control means is configured to suppress the exciting current during an idling condition of an engine mounted on the vehicle.

3. The power generation control apparatus for a vehicle according to claim 1, wherein the exciting current control means is configured to halt the execution of suppressing the exciting current while the output voltage of the vehicle generator is not more than a predetermined value.

4. The power generation control apparatus for a vehicle according to claim 3, wherein the exciting current control means is configured to halt the execution of suppressing the exciting current while the rotation speed of the vehicle generator is less than 800 rpm and more than 3,500 rpm.

5. The power generation control apparatus for a vehicle according to claim 1, wherein the torque estimating and exciting current limiting value determining means is configured to calculate a sum of the generation torque and the inertia torque, to calculate an average value of a total sum of the generation torque and the inertia torque obtained through latest n-times calculations (where, "n" in a natural number), to calculate an exciting current limiting value based on the average value of the total sum of the generation torque and the inertia torque, and to transfer the exciting current limiting value to the exciting current control means, and the exciting current control means is configured to receive the exciting current limiting value, and to control the suppression of the exciting current flowing through the exciting winding based on the received exciting current limiting value.

6. The power generation control apparatus for a vehicle according to claim 3, wherein the predetermined value of the output voltage of the vehicle generator is 11V.

* * * * *